United States Patent [19]

Neil et al.

[11] Patent Number: 4,949,095
[45] Date of Patent: Aug. 14, 1990

[54] FUSED SILICA RADOME

[75] Inventors: Jeffrey T. Neil, Acton; Leslie J. Bowen, Concord, both of Mass.; Brett E. Michaud, Barrington, N.H.

[73] Assignee: GTE Laboratories Incorporated, Waltham, Mass.

[21] Appl. No.: 277,179

[22] Filed: Nov. 29, 1988

[51] Int. Cl.$^5$ .............................................. H01Q 1/42
[52] U.S. Cl. ........................ 343/872; 343/911 R; 342/4; 342/5; 102/292
[58] Field of Search ............ 342/4, 5; 343/872, 911 R; 102/292

[56] References Cited

U.S. PATENT DOCUMENTS

| | | | |
|---|---|---|---|
| 3,095,162 | 6/1963 | Keon | 244/1 |
| 3,292,544 | 12/1966 | Caldwell et al. | 102/92.5 |
| 3,336,873 | 8/1967 | Wilford | 102/105 |
| 3,396,220 | 8/1968 | Garside et al. | 264/65 |
| 3,596,604 | 8/1971 | Corkery | 102/105 |
| 3,680,130 | 7/1972 | Jones et al. | 343/708 |
| 4,358,772 | 11/1982 | Leggett | 343/872 |
| 4,364,884 | 12/1982 | Traut | 264/118 |
| 4,506,269 | 3/1985 | Greene | 343/872 |
| 4,522,883 | 6/1985 | Wallace et al. | 428/365 |
| 4,615,859 | 10/1986 | Traut | 264/570 |
| 4,615,933 | 10/1986 | Traut | 428/252 |
| 4,632,686 | 12/1986 | Brown et al. | 65/18.1 |
| 4,642,299 | 2/1987 | Hsieh | 343/872 X |
| 4,654,315 | 3/1987 | Hsieh | 501/98 |
| 4,708,943 | 11/1987 | Hsieh et al. | 343/872 X |
| 4,713,104 | 12/1987 | Brown et al. | 65/18.1 |

OTHER PUBLICATIONS

Brunswick Corp.'s Slip Cast Fused Silica (SCFS) Brochure, 16 pages (1987).
GTE Sylvania Emissive Products' Fused Quartz Brochure, 14 pages (1985).

*Primary Examiner*—Peter A. Nelson
*Attorney, Agent, or Firm*—Ivan L. Ericson; Frances P. Craig

[57] ABSTRACT

A new and improved fused silica radome is discussed. The radome has a density equal to or greater than 95 percent of theoretical density, an average bend strength equal to or greater than 10 Kpsi, a thermal expansion of about $0.3 \times 10^{-6}$° C., a dielectric constant of about 3.8 at X-Band frequencies, a loss tangent of about 0.002 at X-Band frequencies, an average modulus of rupture greater than 10 Kpsi from room temperature to 1000° C., and no crystalline phase present. The radome is made by an arc fusion process in which a quartz powder is placed within a graphite mold, then shaped by centrifugal force as the mold is rotated. An arc is then struck between electrodes within the mold cavity. The quartz powder fuses to form a dense silica radome which is removed from the mold after the fusion occurs.

5 Claims, 2 Drawing Sheets

FUSED SILICA RADOME

FIELD OF THE INVENTION

This invention relates to a silica article of manufacture. More particularly, this invention relates to a silica radome.

BACKGROUND OF THE INVENTION

This invention concerns radomes. Examples of radomes are disclosed in U.S. Pat. Nos. 4,615,933, 4,615,859, 4,522,883, 4,506,269, 4,364,884, 3,680,130, 3,496,604, 3,396,220, 3,293,544 and 3,095,162. This invention is particularly concerned with fused silica radomes such as are disclosed in U.S. Pat. Nos. 3,680,130 and 3,336,873.

Fused silica is a material whose thermal shock resistance, low dielectric constant, low loss tangent, and high temperature capability make it an excellent candidate for missile radomes.

In the slip casting process, carefully controlled particle size distributions of fused silica powder are suspended in water and cast into plaster of paris molds. After careful drying in controlled humidity conditions the parts are then "sintered" to final density.

The difficulty in sintering fused silica is that densification occurs by a viscous flow mechanism and that the temperature required to achieve substantial densification also causes crystallization. The crystallization reduces the thermal shock capabilities of the material.

The current practice is therefore to control the powder particle size distribution during casting such that as-cast densities of over 80% of the theoretical density value are obtained followed by a sintering which only increases density to about 85% of full density.

The drawbacks of current fused silica radome material lie primarily with the low density, which in turn leads to low strength, low rain erosion resistance, and the need to seal the radome against moisture.

SUMMARY OF THE INVENTION

In accordance with one aspect of the present invention, a new and improved radome comprises a fused silica radome having a density equal to or greater than 95 percent of theoretical density.

In accordance with another aspect of the present invention, a new and improved radome comprises a fused silica radome having a density equal to or greater than 95 percent of theoretical density, an average bend strength equal to or greater than 10 Kpsi, a thermal expansion of about $0.3 \times 10^{-6}/°C.$, a thermal conductivity of about 1.2 BTU/hr,ft,°F., a dielectric constant of about 3.8 at X-Band frequencies, a loss tangent of about 0.002 at X-Band frequencies, an average modulus of rupture greater than 10 Kpsi from room temperature to 1000° C., and no crystalline phase present.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

The present invention overcomes many of the mechanical property limitations of slip cast fused silica radomes. The arc fusion technique requires less particle size distribution control and employs a fusion and cooling rate sufficiently fast that no crystalline phase forms which would reduce the thermal shock capabilities of the material.

To perform arc fusion, a quartz or fused silica powder is poured between a graphite mold and a mandrel and held in place by centrifugal force and a vacuum as the mold is rotated. An arc is then struck between electrodes placed within the mold cavity.

The material fuses from inside to outside achieving near theoretical density in the process.

To more fully illustrate this invention, the following non-limiting example for making a 7" diameter by 20" high dense fused silica radome is presented.

EXAMPLE

Figure 2:
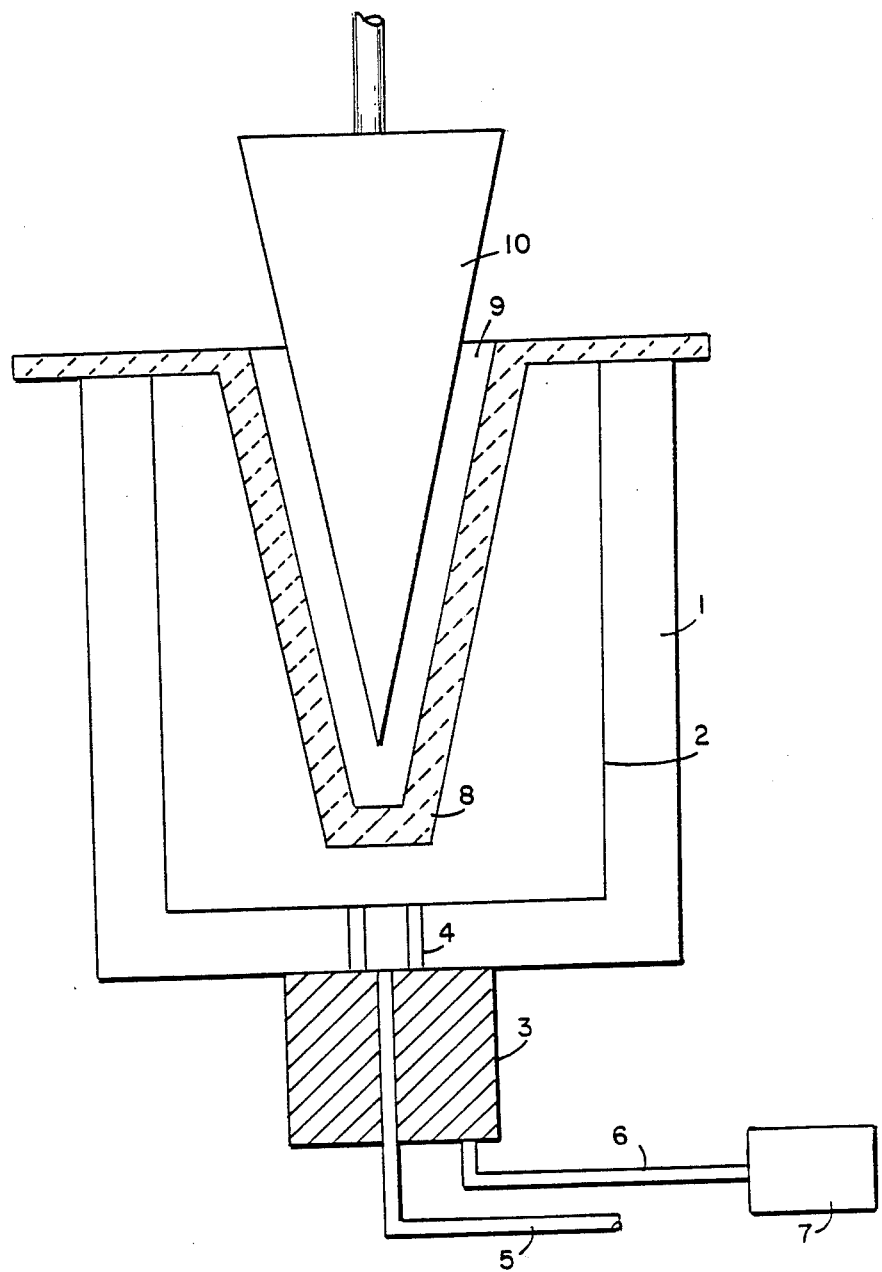
FIG. 2 depicts a diagrammatical representation of the arc fusion molding equipment for making radomes in accordance with the present invention.

As depicted in FIG. 2, nine pounds of crystalline quartz sand (9) having a particle size from about 20 microns to about 400 microns was poured into rotating graphite interior mold (8). Rotating mandrel (10) forms the near net ID shape of the radome during the filling of rotating graphite interior mold (8). The rotating graphite interior mold (8) is perforated with 3/32" holes equally spaced. Graphite interior mold (8) is surrounded by porous carbon liner (2) to stop sand from being pulled into vacuum pump (7) through pipe (6) when a vacuum of 5000 Pa is applied throughout the fusion. The vacuum holds the sand in position against graphite interior mold (8). The graphite interior mold (8), porous carbon (2), and water cooled bucket (1) cooled by means of pipe (5) all rotate by mean of rotating spindle (3) that is capable of transferring vacuum through holes (4) in the bottom of water cooled bucket (1) between 180-210 RPM's through the fusion cycle. Three 1" diameter by 12" long graphite electrodes produce a three phase AC arc used as the heat source for fusion directly above the radome and cavity. The arc fusion parameters used to produce the 7"×20" radome are as depicted in Table I.

TABLE I

| PROGRAM STEP | TIME (SEC) | AMPS | ELECTRODE TIP TO TOP OF MOLD DISTANCE (INCHES) | VOLTAGE DROP (VOLTS) |
|---|---|---|---|---|
| 1 | 40 | 1000 | 8" above | 150 |
| 2 | 40 | 1000 | 6" above | 150 |
| 3 | 40 | 1000 | 4" above | 150 |
| 4 | 40 | 1000 | 2" above | 150 |
| 5 | 65 | 1000 | 0" even | 150 |
| 6 | 65 | 1200 | 2" below | 200 |
| 7 | 65 | 1200 | 4" below | 200 |

Total time 355 seconds

After the fusion cycle was completed the rotation was stopped and graphite interior mold (8) with porous carbon liner (2) were immediately pulled from the water cooled bucket (1). Graphite interior mold (8) was manually inverted and the near net shape radome was removed from graphite interior mold (8). The near net shape radome was cooled to room temperature in ambient conditions and was ready for interior-exterior machining.

The mechanical properties of arc fused silica are greatly superior to those of slip cast fused silica as depicted in Table II.

TABLE II

| MECHANICAL PROPERTIES OF MATERIALS USED FOR RADOMES | | |
|---|---|---|
|  | Slip Cast Fused Silica | Dense Arc Fused Silica |
| Density (gm/cc) | 1.95 | 2.20 |
| Bend Strength (Kpsi) | 5.0 | 15.8 |
| Young's Modulus (Mpsi) | 3.5 | 10.5 |
| Thermal Expansion ($\times 10^{-6}/°C$) | 0.3 | 0.3 |
| Thermal Conductivity | 0.5 | 1.2 |
| Dielectric Constant | 3.3 | 3.8 |
| Loss Tangent | 0.001 | 0.002 |

Figure 1:
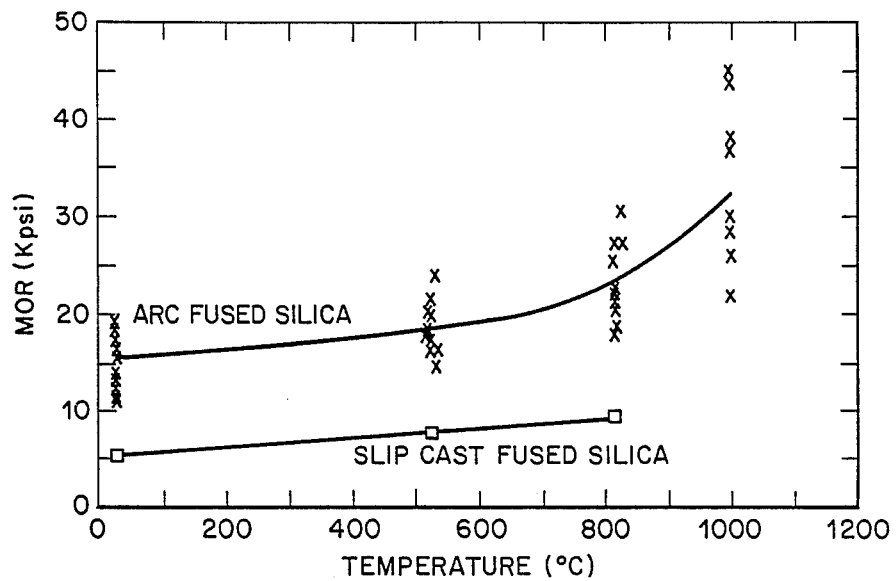
FIG. 1 depicts curves of modulus of rupture (MOR) values as a function of temperature of arc fused silica versus slip cast fused silica materials used for radomes.

The modulus of rupture (MOR) strength of arc fused silica as a function of temperature measured using $0.050 \times 0.100 \times 1.00$ inch bars tested in four point flexure and compared to slip cast fused silica is shown in FIG. 1.

The arc fusion process has an additional benefit when applied to radome fabrication. From an economic point of view the short duration of the radome fabrication (15 minutes for the arc fusion process of the present invention versus days for slip casting) leads to enhanced manufacturing flexibility.

In summary the present invention involves the utilization of arc fusion for the fabrication of fused silica radomes to obtain superior characteristics over slip cast fused silica radomes.

While there has been shown and described what is at present considered the preferred embodiment of the invention, it will be obvious to those skilled in the art that various changes and modifications may be made therein without departing from the scope of the invention as defined by the appended claims.

What is claimed is:

1. A silica radome comprising a fused silica radome having a density equal to or greater than 95 percent of theoretical density.

2. A silica radome in accordance with claim 1 wherein said fused silica radome has an average modulus of rupture greater than 10 Kpsi from room temperature to 1000° C. and no crystalline phase present.

3. A silica radome in accordance with claim 1 wherein said fused silica radome has a modulus of rupture ranging from about 20 Kpsi to about 45 Kpsi a 1000° C.

4. A silica radome in accordance with claim 1 wherein said fused silica radome has no crystalline phase present.

5. A silica radome comprising a fused silica radome having a density equal to or greater than 95 percent of theoretical density, an average bend strength equal to or greater than 10 Kpsi, a thermal expansion of about $0.3 \times 10^{-6}/°C$., a thermal conductivity of about 1.2 BTU/hr,ft,°F., a dielectric constant of about 3.8 at X-Band frequencies, a loss tangent of about 0.002 at X-Band frequencies, an average modulus of rupture greater than 10 Kpsi from room temperature to 1000° C., and no crystalline phase present.

* * * * *